IN-LINE REMOVABLE FILTER ASSEMBLY
Filed Nov. 6, 1961
FIG. 1
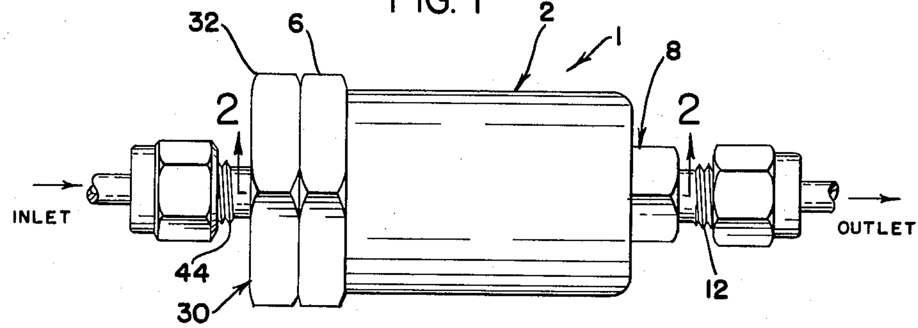
FIG. 2
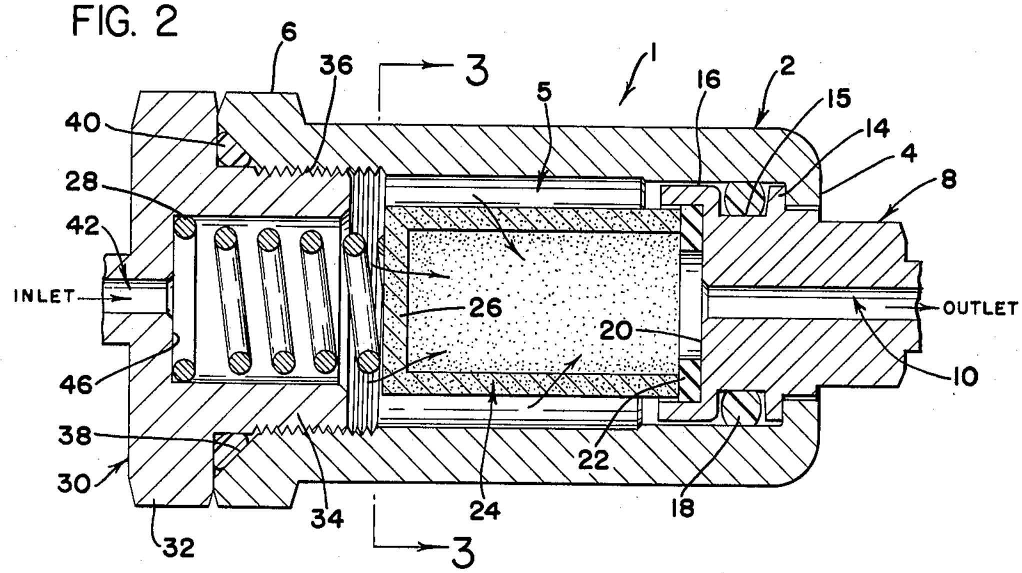
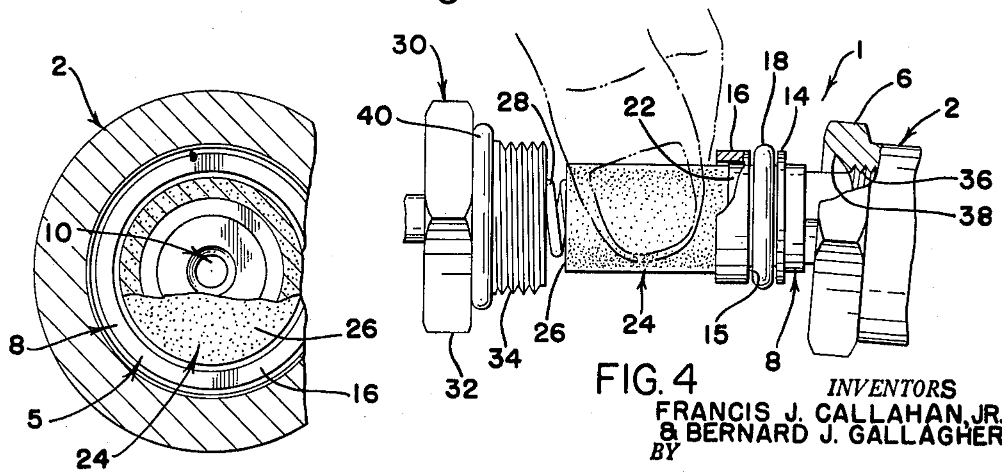
FIG. 3
FIG. 4
INVENTORS
FRANCIS J. CALLAHAN, JR.
& BERNARD J. GALLAGHER
BY
Fay & Fay
ATTORNEYS United States Patent Office 3,240,342

Patented Mar. 15, 1966

3,240,342

IN-LINE REMOVABLE FILTER ASSEMBLY

Francis J. Callahan, Jr., Chagrin Falls, and Bernard J. Gallagher, Cleveland Heights, Ohio, assignors to Nuclear Products Company, Cleveland, Ohio, a corporation of Ohio Filed Nov. 6, 1961, Ser. No. 150,479
7 Claims. (Cl. 210—232)

This invention concerns an efficient in-line filter structure having means of replacing the filter element without removing the filter housing from the line. Its novel structure withstands high pressures and provides large filtering area for minimum pressure drop and maximum filter element life. In its broadest aspect, the invention comprises a resiliently mounted filter element disposed in spaced relation to an axially movable outer body member which permits lateral removal and replacement of the filter element without removal of the filter housing from the line.

In general, the filter structure of this invention may be used wherever fluid system contamination must be avoided. It is particularly adapted for mounting upstream from solenoid and metering valves on instrument air and fluid control systems and for use on all types of cooling systems for machinery and electronic equipment. Mounted in this manner, the filter acts efficiently to reduce wear and prevent clogging of orifices and clearances between mating parts so that the protected equipment can function as intended.

The known filters of this general type have utilized for sealing their elements direct compression-in-line mountings which are difficult to assemble and maintain in leak-tight condition and do not facilitate quick replacement of the filter element. Moreover, these known filter structures have restricted flow areas which create pressure drop and turbulence. None of the known in-line filters have provided a satisfactory structure which permits quick disassembly and replacement of the filter element without any forcing apart of the connecting lines. Furthermore, the prior in-line mounted filters have not provided large exposed element areas or vibration damping means which seal the element in leak-tight relation with the rest of the structure.

With the foregoing problems in mind, it is the general object of this invention to provide an improved in-line filter device which permits fast changes of the filter element without forcing the lines or removing the filter housing from the system.

It is a further object to provide an in-line filter structure with an element which has a large exposed filter area and unrestricted flow area.

It is another object of the invention to provide a leak-tight in-line filter structure having a vibration-damped element.

Other and more specific objects of the invention will become apparent from the detailed description to follow.

Generally, the invention contemplates a flow-line filter structure which comprises an outer body having an axial passageway, an apertured collar releasably sealed in the end of the passageway, a filter element disposed in the passageway in spaced relation to the outer body, a resilient means axially urging the filter element in releasably sealed relation with the collar, and an apertured inner body in releasably sealed relation with the outer body axially abutting the resilient means, thereby permitting the filter element to be replaced without relative movement of the inner body with respect to the collar.

More particularly, the invention as illustrated contemplates a flow-line filter structure which includes an outer body of substantially cylindrical shape provided with an inwardly disposed flange on one end and an outwardly disposed flange on the opposite end, and an axial passageway throughout its length. A collar member having an outward passageway and integral tubing line connection means is sealed in sliding engagement with the outer body by means of an O-ring and is limited from movement in one direction relative to the outer body by the inwardly disposed flange. A generally tubular-shaped filter element is disposed in the passageway in spaced relation to the outer body such that it may be sealed around the periphery of the collar outlet by gasket means and is abutted by a spring means to hold the filter element in position with respect to the collar. The filter element may have one or both ends closed and may be of sintered metal, wire mesh, ceramic, or conventional porous plastic construction. Also, absorption type elements may be used instead of surface type.

An inner body member threadedly engages the end of the outer body and has an outwardly disposed flange, an inlet passageway, and an integral line connection means. The outwardly disposed flange of the inner body abuts the outwardly disposed flange of the outer body and a sealing O-ring, which is disposed between portions of the flanges. The inner end of the inlet of the inner body has a spring seat securing the spring and holding it in abutting relationship with the end of the filter element so that the filter element may be replaced laterally from its position by depressing the spring without relative movement of the inner body with respect to the collar.

In the use of the filter of the invention, as with all filters, a deposit, termed a filter cake, accumulates on the element during usage. This filter cake in actuality increases the efficiency of the filter element in that it also will remove some smaller particles. Depending on the amount of flow, the type of fluid, the amount of contaminant present, and the size and type of the element, a filter may last for a few hours to many weeks without a change of elements. The novel filter of this invention is adaptable to many filtration applications by changing element sizes and types and may be used to filter either gases or liquids.

A most important and distinct advantage of the invention is its ease of maintenance which results from the unique design which permits visual inspection and fast changes of filter elements without removal of the filter housing from the system.

A further advantage of the invention is the large exposed element area which provides 1.2 to 1.8 times the filtering area available in most in-line filters on the market at the present time.

A still further advantage of this invention is that the dual-purpose rubber gaskets and springs seal the filter element against the possibility of any line fluid bypassing the element and provide a cushion against vibration.

Another advantage of the filter structure of the invention is the provision of integral tube connections which enable a compact in-line assembly.

Still another advantage of the structure is that the seals are O-rings backed by metal and can withstand relatively high pressures.

Referring now to the drawings:

FIG. 1 is a side elevation of the filter assembly.

FIG. 2 is an enlarged longitudinal sectional view of the valve structure along the line 2—2 of FIG. 1.

FIG. 3 is a fragmentary cross-sectional view along the line 3—3 of FIG. 2.

FIG. 4 is a side elevation illustrating the removal of the filter element.

Describing now more particularly the filter structure illustrated in the drawings, wherein like numerals designate like parts in the several views:

A novel filter structure according to the principles of the invention is generally designated by the numeral 1. The structure comprises an outer body member or ferrule 2, which is in the form of a cylinder having an inwardly disposed flange 4 and an outwardly disposed flange 6 on its opposite ends. Coaxially disposed in the bore 5 defined by the inwardly disposed flange 4 is a collar 8 having an outlet passageway 10 and integral tube fitting means 12 thereon.

The collar 8 abuts the flange 4 at its inner surface by means of an outwardly disposed rib 14 of slightly smaller diameter than the inner bore of the outer body 2. Axially inwardly disposed on the collar 8 adjacent the rib or flange 14 is a groove 15 bounded on its axially inward side by a flange 16. Contained within the groove 15 is a rubber O-ring 18 of slightly larger diameter than the depth of the groove 15. This entirely metal-backed O-ring is under compression between the inner surface of the body 2 and the bottom of the groove 15 and thereby forms an effective sliding seal which can withstand relatively high pressures.

A rubber annular gasket 22 of soft 70-durometer rubber is held under compression in the seat 20 of the collar 8, concentric with the outlet passageway 10, by a filter element 24 which is illustrated as being of the sintered type with a cylindrical shape and an end adjacent the collar and gasket 22. The opposite end 26 of the filter element 24 is abutted by the smaller end of a double diameter stainless steel spring 28. The soft rubber gasket and spring thereby form a vibration damping means for the element which prevents flutter and resulting fluid bypass or damage to the element.

The filter element and spring are spaced from the inner walls of the ferrule 2 to provide an unrestricted flow passage area and a large exposed filter area. The unrestricted flow passage area results in a lower pressure drop and less turbulence within the structure and the large exposed filter area permits longer element life. A conventional element mounted in this manner has 1.2 to 1.8 times the filtering area available in most in-line filter structures.

The end of the spring opposite the filter element abuts an inner body member or plug 30 in a seat 46 which grips the spring in radial compression at its larger end. The inner body 30 has an outwardly directed flange 32 and an axially directed body portion 34 threaded for engagement with the threads 36 on the end of the outer ferrule opposite the flange 6. The flanges 6 of the outer body and 32 of the inner body abut one another in metal-to-metal engagement and the flange 6 has a relieved portion 38 beveled at approximately 45 degrees from the inner surface of the ferrule to permit the enclosed seating of a slightly oversized rubber O-ring 40, which is thereby maintained under compression and seals the flanges of the inner body 30 and the outer ferrule 2. The inner body has integral tube connection means 44 and an inlet passageway 42 therein concentric with the spring seat 46.

The fluid passes through the inlet passageway 42 and into the filter structure between the turns of the spring 28 and along the passageway between the element 24 and the inner surface of the ferrule 2. The force of the flow of the fluid from the inlet passageway abuts the closed end 26 of the filter element to force the element 24 against the rubber gasket 22 in the seat 20 and the collar 8. Thus, the higher the pressure. the more leak-tight is the seal between the filter and the collar thereby eliminating the possibility of any fluid bypassing the element. This arrangement in combination with the all metal backed O-ring seals provides a very efficient high pressure structure.

The integral double ferrule tube fitting means on the element collar 8 and the inner body 30 permits reliable connections directly to the tubing of the line and eliminates the need for additional fittings. Flanges 6 and 32 are hexagonal in shape to provide ease in turning and threadedly engaging the parts in leak tight relation. These features provide a compact structure which, when used with a ¼ inch tubing line, for instance, has an overall length of 3²¹⁄₃₂ inches and a hex size of 1⅛ inches on the flanges 6 and 32. A conventional fitting hex size of ⁹⁄₁₆ inch is provided to eliminate the need for special tools or additional fittings.

Although the integral tube fitting means provide a desirable structure for most applications, as is obvious from the drawings, male or female pipe connections or any other type of connection may be used with the filter of this invention.

It is important to the invention that the collar or ferrule does not make a direct compression seal with the body parts and that the filter element is resiliently mounted and vibration damped with respect to the rest of the structure. This prevents bypassing of the element by the contaminated fluid, allows for line expansion and contraction due to temperature differentials, and permits replacement of the filter without any forcing apart or displacement of the connecting lines or the collar 8 relative to the inner body member 30.

To change the filter element, the ferrule or outer body 2 is unscrewed from the inner body 30 and slipped over the line as illustrated in FIG. 4. The hexagonal shape of the flange 6 and the flange 32 facilitates the unscrewing of these elements. After the ferrule body 2 has been displaced axially from around the filter element and collar, the element 24 is gripped and pushed axially away from the ferrule toward the inner body member 30, thereby compressing the spring at 28 and unseating the element from its seat in the collar member. The element is then withdrawn laterally from out of axial alignment with the structure to move it out of its seated position with the collar. Because of its radial grip on the larger diameter of the spring 28, the member 30 holds the spring in position in the seat 46 with the element 24 removed. A new element 24 is then laterally inserted in coaxial alignment with the seats and passageways and the spring 28 depressed as it is inserted against the gasket 22 in the seat 20 of the collar 8. The outer body ferrule 2 is then slid axially against the threads and retightened using the hexagonal portion of the flange 6 and the flange 32 to get a metal-to-metal contact between portions of the two flanges. Complete retightening is required if the filter pressure rating is to be maintained. Thus, a replacement job which formerly required 20 to 30 minutes has been accomplished in a much shorter time because of the novel structure of the invention.

The filter of the invention may be used to trap all kinds of particles. The coarse noncompressible particles are easiest to filter since slimy compressible solids tend to slip through smaller pores and pack together rapidly restricting flow. Basically, the onstream time before an element must be changed depends upon the amount of flow, the type of fluid, the amount of contaminant present, and the size and type of the element. A filter that may last only a few hours in one system may last many weeks in another. A pressure drop is sometimes used as a signaling device to indicate when an element change is necessary. Two pressure gauges or a U-type manometer are connected close to the inlet and outlet sides of the filter. When the pressure drop reaches a predetermined maximum allowable point, the element is changed or cleaned.

Materials which have been used in constructing the illustrated filter embodiment in accordance with the principles of this invention, listed here merely for illustrative purposes, are:

For the body parts, brass or type 316 stainless steel;

For the O-rings and rubber gasket, 70 durometer "Buna-N" with brass bodies and "Viton-A" with stainless steel bodies;

For the spring, type 302 stainless steel; and

For the filter elements, type 316 sintered stainless steel;

The nuts and ferrules are of the same materials as the body parts.

For ease of description, the principles of the invention have been set forth in connection with but a single illustrated embodiment but it is not our intention that the illustrated embodiment or the terminology employed in describing it be limiting inasmuch as variations from these may be made without departing from the spirit of the invention. Rather we desire to be restricted only by the scope of the appended claims.

The invention claimed is:

1. A flow-line filter structure which comprises an outer body having an axial passageway, an apertured collar with integral line connection means thereon releasably sealed in an end of said passageway, an apertured inner body with integral line connection means thereon and in releasably sealed relation with said outer body, means to make said outer body removable by permitting relative axial movement of said outer body in at least one direction without axial movement of said collar relative to said inner body, a filter element disposed in said passageway in spaced relation to said outer body, a spring axially urging said filter element in releasably sealed relation with said collar, said spring axially abutting said apertured inner body whereby said filter element may be replaced without relative axial movement of said inner body with respect to said collar.

2. A flow-line filter structure which comprises an outer body having an inwardly disposed flange on one end and an outwardly disposed flange on the opposite end in an axial passageway, an apertured collar with integral line connection means thereon releasably sealed in said passageway in abutting relation with said inwardly disposed flange by means permitting relative axial movement of said outer body in at least one direction, a filter element disposed in said passageway in spaced relation to said outer body, a spring axially urging said filter element in releasably sealed relation with said collar, and an apertured inner body with integral line connection means thereon and axially abutting said spring and having an outwardly disposed flange abutting the outwardly disposed flange of said outer body in releasably sealed relation with said outer body, whereby said filter element may be replaced without relative movement of said inner body with respect to said collar.

3. The structure of claim 2 in which the outer body includes means to allow rotation of said outer body and thereby move axially away from the outwardly disposed flange of the inner body to a point axially disposed from said filter element.

4. The structure of claim 3 in which the axial dimension of the filter element is less than the axial distance between the collar and the inner body.

5. The structure of claim 4 in which said spring is releasably secured to said inner body.

6. The structure of claim 4 in which the apertured collar and the passageway are releasably sealed by means of an O-ring under compression, and said inner body and said outer body are releasably sealed by means of an O-ring under compression between opposed portions of their abutting outwardly disposed flanges.

7. The structure of claim 6 in which said filter element and said collar are releasably sealed by means of a resilient gasket interposed therebetween.

References Cited by the Examiner

UNITED STATES PATENTS

| | | | |
|---|---|---|---|
| 852,584 | 5/1907 | Skinner | 285—354 X |
| 1,156,274 | 10/1915 | Cormeny | 210—232 X |
| 2,068,048 | 1/1937 | Adams | 210—452 X |
| 2,761,529 | 9/1956 | Wisenbaugh | 210—452 X |
| 2,819,799 | 1/1958 | Wilkerson | 210—430 |
| 3,004,670 | 10/1961 | Zonker | 210—429 |

OTHER REFERENCES

Reinsch, E. W., Filters Made of Porous Metal Can Be Fabricated in Special Shapes, Product Engineering, November 1914, page 770 relied on.

REUBEN FRIEDMAN, *Primary Examiner.*

HERBERT L. MARTIN, *Examiner.*